United States Patent
Podszun et al.

(10) Patent No.: US 6,365,066 B1
(45) Date of Patent: Apr. 2, 2002

(54) ANTIFOULING PAINT

(75) Inventors: Wolfgang Podszun; Markus Mechtel, both of Köln; Karl-Heinz Kaesler, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/284,712

(22) PCT Filed: Oct. 13, 1997

(86) PCT No.: PCT/EP97/05627

§ 371 Date: Apr. 19, 1999

§ 102(e) Date: Apr. 19, 1999

(87) PCT Pub. No.: WO98/17733

PCT Pub. Date: Apr. 30, 1998

(30) Foreign Application Priority Data

Oct. 24, 1996 (DE) .......................... 196 44 224

(51) Int. Cl.$^7$ ................................. C08K 5/19
(52) U.S. Cl. ................. 252/380; 424/76.8; 424/405; 424/408; 424/560; 106/15.05; 106/18.32
(58) Field of Search ................. 424/76.8, 405, 424/408, 500; 252/380; 106/15.05, 18.32

(56) References Cited

U.S. PATENT DOCUMENTS

| | | | |
|---|---|---|---|
| 4,561,981 A | 12/1985 | Characklis | 210/696 |
| 4,866,106 A | 9/1989 | Pellow et al. | 328/122 |
| 4,990,547 A | 2/1991 | Stovicek | 328/405 |
| 5,096,488 A | 3/1992 | Stovicek | 328/18.32 |
| 5,173,110 A | 12/1992 | Stovicek | 328/18.32 |
| 5,695,552 A | 12/1997 | Taylor | 106/15.05 |
| 5,919,689 A * | 7/1999 | Selvig et al. | 435/202 |

FOREIGN PATENT DOCUMENTS

EP 0 679 333 11/1995

OTHER PUBLICATIONS

Chemical Abstracts, vol. 84, No. 12, #75808n.
Evans, C.J., Organotins Combat Marine Fouling, Feb. 4, 1987, vol. 177, No. 4184, Polymers Paint Colour, Journal, pp. 70, 72, and 76.
Price, R.R. et al, (month unavailable) 1992, Performance Enhancement of Natural Antifouling Compounds and Their Analogs Through Microencapsulation and Controlled Release, Biofouling, vol. 6, pp. 207–216.
Noren, G.K. et al, Mar. 1986, Investigation of Microencapsulated Fungicides for Use in Exterior Trade Sales Paints, Journal of Coatings Technology, 58, pp. 31–39.

* cited by examiner

*Primary Examiner*—Jill Warden
*Assistant Examiner*—Monique T. Cole
(74) *Attorney, Agent, or Firm*—Joseph C. Gil; Richard E. L. Henderson

(57) ABSTRACT

This invention relates to compositions comprising (a) film formers and (b) microencapsulated biocides that are free of heavy metals and to methods for making such compositions. This invention further relates to antifouling compositions and antifouling coatings.

7 Claims, No Drawings

ANTIFOULING PAINT

BACKGROUND OF THE INVENTION

The invention relates to the use of microencapsulated heavy-metal-free biocides in antifouling coating compositions.

Antifouling coatings for preventing infestation by algae, barnacles, tube worms, mussels or other marine organisms on the surface of articles which come into contact with sea water or brackish water have been used for a long time. Infestation growth is a severe problem especially in the case of ships, since, for example, the frictional resistance is increased and, as a consequence of the increased energy consumption and frequent spells in dry dock, the operating costs are significantly heightened.

A distinction can be made between antifouling coatings which include biocides and those which are biocide-free. Biocide-free antifouling coatings possess anti-adhesion properties, which are intended to prevent the attachment of marine organisms. The effectiveness of the prior art biocide-free antifouling coatings, however, is limited, so that mechanical cleaning of the ship's hull or of the underwater construction becomes necessary within relatively short periods of time. More effective are antifouling coating which comprise biocides which kill the infestation-forming organisms. Customary antifouling biocides are organotin compounds. Copper antimony and bismuth compounds have also been proposed, these, however, are less effective. The night part of the prior art biocide-containing antifouling coatings is their low environmental compatibility. Antifouling biocides which contain heavy metals are particularly problematic, since they cause contamination of the sea water and of the sea bed, especially in the area of harbours.

In contradistinction to these biocides which comprise heavy metals, heavy-metal-free biocides, which are generally of lower ecotoxicity, since they can frequently be broken down into non-toxic metabolites in sea water, do not have a good long-term action, since, apparently, the active substance is degraded prematurely while still in the coating.

The object of the present invention is therefore to provide a highly effective antifouling coating which has good long-term action and improved environmental compatibility.

It has now been found that antifouling coatings with heavy-metal-free biocides exhibit an improved long-term action if the biocide is in microencapsulated form.

SUMMARY OF THE INVENTION

The invention therefore provides antifouling compositions and antifouling coatings based on film-formers and biocides, which are characterized in that the biocides are microencapsulated.

DETAILED DESCRIPTION OF THE INVENTION

Suitable biocides are preferably heavy-metal-free algicides, fungicides, insecticides, molluscicides and bactericides.
Triazoles:
   Azaconazole, bromuconazole, cyproconazole, dichlobutrazol, diniconazole, hexconazole, metconazole, penconazole, propiconazole, tebuconazole, amitrole, azocyclotin, epoxyconazole, bitertanol, difenoconazole, fenbuconazole, fenchlorazole, fenethanil, fluquinconazole, flusilazole, flutriafol, imibenconazole, isozofos, myclobutanil, paclobutrazol, (±)-cis-1-(4-chlorophenyl)-2-( 1H-1,2,4-triazol-1-yl)-cycloheptanol, tetraconazole, triadimefon, triadimenol, triapenthenol, triflumizole, triticonazole, uniconazole and their metal salts and acid adducts.
Imidazoles:
   Imazalil, pefurazoate, prochloraz, triflumizole.
   Thiazolecarboxanilides, such as 2',6'-dibromo-2-methyl-4-trifluoromethoxy-4'-trifluoromethyl-1,3-thiazole-5-carboxanilide and their metal salts and acid adducts.
Succinate dehydrogenase inhibitors, such as:
   Fenfuram, furcarbanil, cyclafluramid, furmecyclox, seedvax, metsulfovax, pyrocarbolid, oxycarboxin, Shirlan, mebenil (mepronil), benodanil, flutolanil (Moncut);
Naphthalene derivatives, such as:
   Terbinafine, naftifine, butenafine;
   Sulphenamides, such as dichlofluanid, tolylfluanid, folpet, fluorfolpet; captan, captofol;
   Benzimidazoles, such as carbendazim, benomyl, furathiocarb, fuberidazole, thiophonatmethyl, thiabendazole or salts thereof;
   Morpholine derivatives, such as tridemorph, fenpropimorph, falimorph, dimethomorph, dodemorph; aldimorph, fenpropidin and their salts with arylsulphonic acids, such as p-toluenesulphonic acid and p-dodecylphenyl-sulphonic acid;
   Dithiocarbamates, cufraneb, ferbam, mancopper, mancozeb, maneb, metam, metiram, thiram zeneb, ziram:
   Benzothiazoles, such as 2-mercaptobenzothiazole;
   Benzamides, such as 2,6-dichloro-N-(4-trifluoromethylbenzyl)-benzamide;
   Boron compounds, such as boric acid, boric esters, borax;
   Formaldehyde and formaldehyde donor compounds, such as benzyl alcohol mono-(poly)-hemiformal, oxazolidines, hexa-hydro-S-triazines, N-methylolchloracetamide, paraformadehyde, nitropyrine, oxolic acid, tecloftalam;
   Tris-N-(cyclohexyldiazeniumdioxy)-aluminium, N-(cyclo-hexyldiazeniumdioxy)-tributyl, K salts;
   N-Methylisothiazolin-3-one, 5-chloro-N-methylisothiazolin-3-one, 4,5-dichloro-N-octylisothiazolin-3-one, N-octyl-isothiazolin-3-one, 4,5-trimethylene-isothiazolinone, 4,5-benzisothiazolinone;
   Aldehydes, such as cinnamaldehyde, formaldehyde, glutardialdehyde, β-bromo-cinnamaldehyde; thiocyanates, such as thiocyanatomethylthiobenzothiazole, methylenebisthiocyanate, and the like;
   Quaternary ammonium compounds, such as benzyldimethyltetradecylammonium chloride, benzyldimethyldodecylammonium chloride, didecyldimethylammonium chloride;
   Iodine derivatives, such as diiodomethyl p-tolyl sulphone, 3-iodo-2-propinyl alcohol, 4-chlorophenyl-3-iodopropargyl formal, 3-bromo-2,3-diiodo-2-propenyl ethylcarbamate, 2,3,3-triiodoallyl alcohol, 3-bromo-2,3-diiodo-2-propenyl alcohol, 3-iodo-2-propinyl n-butylcarbamate, 3-iodo-2-propinyl-n-butylurea, 3-iodo-2-propinyl n-hexylcarbamate, 3-iodo-2-propinyl cyclohexylcarbamate, 3-iodo-2-propinyl phenylcarbamate;

Phenol derivatives, such as tribromophenol, tetrachlorophenol, 3-methyl-4-chlorophenol, 3,5-dimethyl-4-chlorophenol, phenoxyethanol, dichlorophen, o-phenylphenol, m-phenylphenol, p-phenylphenol, 2-benzyl-4-chlorophenol and their alkali metal salts and alkaline earth metal salts.

Microbicides having an activated halogen group, such as chloroacetamide, N-methylolchloroacetamide, bronopol, bronidox, tectamer such as 2-bromo-2-nitro-1,3-propanediol, 2-bromo-4'-hydroxy-acetophenone, 2,2-dibromo-3-nitrilo-propionamide, 1,2-dibromo-2,4-dicyanobutane, β-bromo-β-nitrostyrene;

Pyridines, such as 1-hydroxy-2-pyridinethione (and the Na, Fe, Cu, Mn, Zn salts thereof), tetrachloro-4-methylsulphonylpyridine, pyrimethanol, mepanipyrim, dipyrithione;

Dialkyldithiocarbamates, such as Na salts of dialkyldithiocarbamates, tetramethylthiuram disulphide, potassium N-methyl-dithiocarbamate;

Nitriles, such as 2,4,5,6-tetrachloroisophthalonitrile, disodium cyano-dithioimidocarbamate;

Quinolines, such as 8-hydroxyquinoline and the Cu salts thereof;

Mucochloric acid, 5-hydroxy-2(5H)-furanone;

4,5-Dichlorodithiazolinone, 4,5-benzodithiazolinone, 4,5-trimethylenedithiazolinone, 4,5-dichloro-(3H)-1,2-dithiol-3-one, 3,5-dimethyl-tetrahydro-1,3,5-thiadiazine-2-thione, N-(2-p-Chlorobenzoylethyl)-hexaminium chloride, potassium N-hydroxymethyl-N'-methyl-dithiocarbamate, 2-Oxo-2-(4-hydroxy-phenyl)acethydroximic acid chloride, Phenyl 2-chloro-cyano-vinyl sulphone, Phenyl 1,2-dichloro-2-cyano-vinyl sulphone.

Furthermore, highly effective compositions are also prepared with the following active substances:

Fungicides:
  Methyl (E)-methoximino[α-(o-tolyloxy)-o-tolyl]acetate, methyl (E)-2-{2-[6-(2-cyanophenoxy)-pyrimidin-4-yloxy]phenyl}-3-methoxyacrylate,
  Acypetacs, 2-aminobutane, ampropylfos, anilazine, benalaxyl, bupirimate, chinomethionat, chloroneb, chlozolinate, cymoxanil, dazomet, diclomezine, dichloram, diethofencarb, dimethirimol, diocab, dithianon, dodine, drazoxolon, edifenphos, ethirimol, etridiazole, fenarimol, fenitropan, fentin acetate, fentin hydroxide, ferimzone, fluazinam, flurormide, flusulfamide, flutriafol, fosetyl, fthalide, furalaxyl, guazatine, hymexazol, iprobenfos, iprodione, isoprothiolane, metalaxyl, methasulfocarb, nitrothal-isopropyl, nuarimol, ofurace, oxadiyl, perflurazoate, pencycuron, phosdiphen, pimaricin, piperalin, procymidone, propamocarb, propineb, pyrazophos, pyrifenox, pyroquilon, quintozene, tar oils, tecnazene, thicyofen, thiophanate-methyl, tolclofos-methyl, triazoxide, trichlamide, tricyclazole, triforine, vinclozolin.

Insecticides:
  Phosphates, such as azinphos-ethyl, azinphos-methyl, α-1 (4-chlorophenyl)-4-(O-ethyl, S-propyl)phosphoryloxy-pyrazole, chlorpyrifos, coumaphos, demeton, demeton-S-methyl, diazinon, dichlorvos, dimethoate, ethoate, ethoprophos, etrimfos, fenitrothion, fenthion, heptenophas, parathion, parathion-methyl, phosalone, phoxim, pirimiphos-ethyl, pirimiphos-methyl, profenofos, prothiofos, sulfprofos, triazophos and trichlorphon;

Carbamates, such as aldicarb, bendiocarb, α-2-(1-methylpropyl)-phenyl methylcarbamate, butocarboxim, butoxycarboxim, carbaryl, carbofuran, carbosulfan, cloethocarb, isoprocarb, methomyl, oxamyl, pirimicarb, promecarb, propoxur and thiodicarb;

Organosilicon compounds, preferably dimethyl(phenyl) silyl-methyl 3-phenoxybenzyl ethers such as dimethyl-(4ethoxyphenyl)-silylmethyl 3-phenoxybenzyl ether, or (dimethylphenyl)-silyl-methyl 2-phenoxy-6-pyridylmethyl ethers, such as e.g. dimethyl-(9-ethoxy-phenyl)-silylmethyl 2-phenoxy-6-pyridylmethyl ether or [(phenyl)-3-(3-phenoxyphenyl)-propyl](dimethyl)-silanes, such as e.g. (4-ethoxyphenyl)-[3-(4-fluoro-3-phenoxyphenyl-propyl]dimethyl-silane, silafluofen;

Pyrethroids, such as allethrin, alphamethrin, bioresmethrin, byfenthrin, cycloprothrin, cyfluthrin, decamethrin, cyhalothrin, cypermethrin, deltamethrin, alpha-cyano-3-propancarboxylate, fenpropathrin, fenfluthrin, fenvalerate, flucythrinate, flumethrin, fluvalinate, permethrin, resmethrin and tralomethrin;

Nitroimines and nitromethylenes, such as 1-[(6-chloro-3-pyridinyl)-methyl]-4,5-dihydro-N-nitro-1H-imidazole-2-amine (imidacloprid), N-[(6-chloro-3-pyridyl) methyl-]$N^2$-cyano-$N^1$-methylacetamide(NI-25);

Abamectin, AC 303, 630, acephate, acrinathrin, alanycarb, aldoxycarb, aldrin, amitraz, azamethiphos, bacillus thuringiensis, phosmet, phosphamidon, phosphine, prallethrin, propaphos, propetamphos, prothoate, pyraclofos, pyrethrins, pyridaben, pyridafenthion, pyriproxyfen, quinalphos, RH-7988, rotenone, sodium fluoride, sodium hexafluorosilicate, sulfotep, sulphuryl fluoride, tar oils, teflubenzuron, tefluthrin, temephos, terbufos, tetrachlorvinphos, tetramethrin, O-2-tert-butyl-pyrimidin-5-yl-o-isopropyl-phosphorothiate, thiocyclam, thiofanox, thiometon, tralomethrin, triflumuron, trimethacarb, vamidothion, verticillium lacanii, XMC, xylylcarb, benfuracarb, bensultap, bifenthrin, bioallethrin, MER-bioallethrin (S)-cyclopentenyl isomer, bromophos, bromophos-ethyl, buprofezin, cadusafos, calcium polysulphide, carbophenothion, cartap, chinomethionat, chlordane, chlorfenvinphos, chlorfluazuron, chlormephos, chloropicrin, chlorpyrifos, cyanophos, beta-cyfluthrin, alpha-cypermethrin, cyophenothrin, cyromazine, dazomet, DDT, demeton-S-methylsulphon, diafenthiuron, dialifos, dicrotophos, diflubenzuron, dinoseb, deoxabenzofos, diaxacarb, disulfoton, DNOC, empenthrin, endosulfan, EPN, esfenvalerate, ethiofencarb, ethion, etofenprox, fenobucarb, fenoxycarb, fensulfothion, fipronil, flucycloxuron, flufenprox, flufenoxuron, fonofos, formetanate, formothion, fosmethilan, furathiocarb, heptachlor, hexaflumuron, hydramethylnon, hydrogen cyanide, hydroprene, IPSP, isazofos, isofenphos, isoprothiolane, isoxathion, iodfenphos, kadethrin, lindane, malathion, mecarbam, mephosfolan, mercurous, chloride, metam, Metarthizium, anisopliae, methacrifos, methamidophos, methidathion, methiocarb, methoprene, methoxychlor, methyl isothiocyanate, metholcarb, mevinphos, monocrotophos, naled, Neodiprion sertifer NPV, nicotine, omethoate, oxydemeton-methyl, pentachlorophenol, petroleum oils, phenothrin, phenthoate, phorate;

Molluscicides:
Fentin acetate, metaldehyde, methiocarb, niclosamide, thiodicarb, trimethacarb;

Algicides:
Dichlororphen, endothal, fentin acetate, quinoclamine;

Herbicides:
Diuron, dichlorophen, endothal, fentinacet, quinochlamine.

Suitable biocides are preferably algicides, such as diuron, dichlorophen, endothal, fentin acetate, quinoclamine, molluscicides, such as fentin acetate, metaldehyde, methiocarb, niclosamide, thiodicarb and trimethacarb, fungicides, such as dichlofluanid, tolylfluanid, iodopropargyl butylcarbamate, fluorfolpet and azoles, such as tebuconazole or customary antifouling active substances, such as 2-(N,N-dimethylthiocarbamoylthio)-5-nitrothiazyl, tetrabutyldistannoxane, 2-tert-butylamino-4-cyclopropylamino-6-methylthio-1,3,5-triazine, 4,5-dichloro-2-n-octyl-4-isothiazolin-3-one, 2,4,5,6-tetrachloroisophthalonitrile, tetramethylthiuram disulphide, 2,4,6-trichlorophenylmaleimide, 2,3,5,6-tetrachloro-4-(methylsulphonyl)-pyridine, diiodomethyl paratryl sulphone, thiabendazole, tetraphenylboron pyridine salt, sodium salt of 2-pyridinethiol 1-oxide.

Other biocides preferred in accordance with the invention are benzothiophen-2-carboxamide S,S-dioxides of the formula (1)

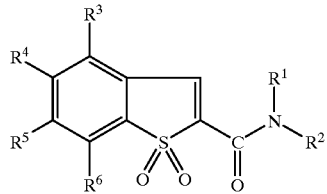

(I)

in which
R$^1$ represents optionally substituted alkyl, represents alkenyl or alkinyl, represents in each case optionally substituted cycloalkyl or cycloalkylalkyl, or represents in each case optionally substituted aralkyl, aralkenyl, aralkinyl or aryl, R$^2$ represents hydrogen or represents optionally substituted alkyl or R$^1$ and R$^2$ together with the nitrogen atom to which they are attached represent an optionally substituted heterocycle and R$^3$, R$^4$, R$^5$ and R$^6$ independently of one another each represent hydrogen, halogen, cyano, nitro, alkyl, alkoxy, alkylthio, halogenoalkyl, halogenoalkoxy or halogenoalkylthio, especially the compound N-cyclohexylbenzothiophen-2-carboxamide S,S-dioxide.

Particularly good effects are also obtained with active-substance combinations preferably of the specified biocides.

Particular preference is given to those biocides which are biodegradable.

The term biodegradable for the purposes of the invention is used for those biocides which have a half life of less than 180 days in sea water at 25° C., preferably less than 90 days. The mechanism of the degradation reaction is not critical for the inventive effect. It may be chemical degradation by, for example, hydrolysis or oxidation, photochemical degradation, or biological degradation by microorganisms.

Examples of suitable degradable biocides can be found, for example, within the group of the phenoxyacetic acids, ureas, thioureas, thiocarbamates, sulphamides and halogenoaromatic compounds.

Preferred active substances are:

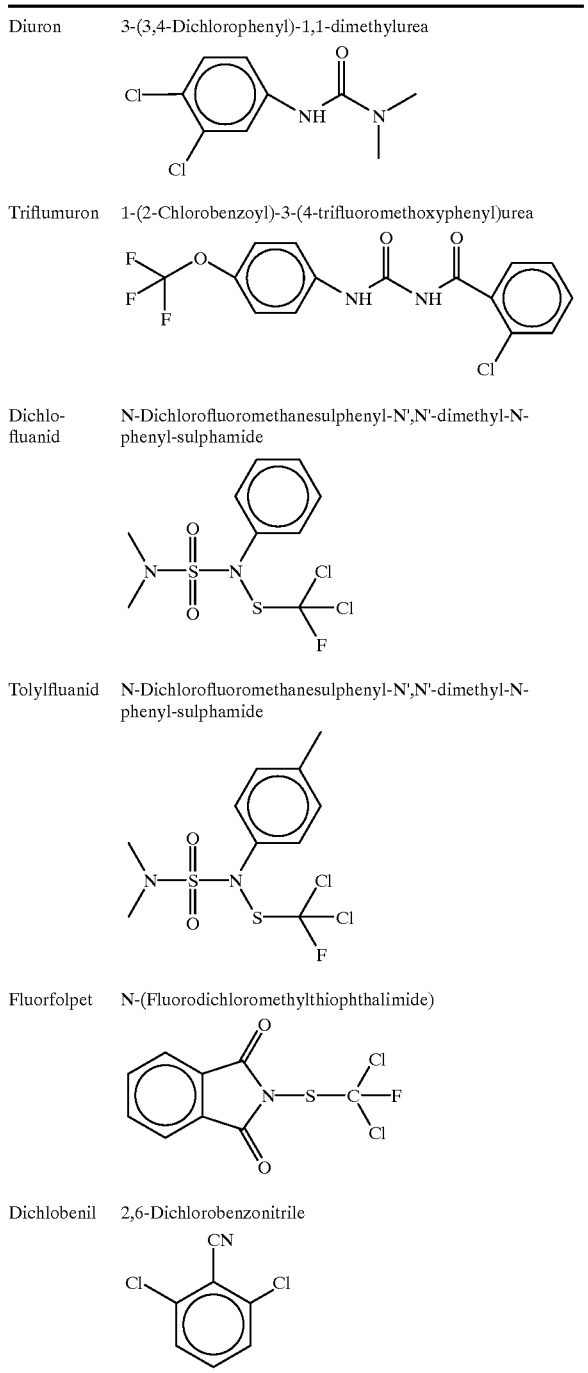

Suitable materials for the microencapsulation of the biocides are the materials known for this purpose, especially polymers. Examples of suitable polymers are polyesters, natural and synthetic polyamides, melamine resins, polyurethanes, polyureas, polysiloxanes, poly(meth) acrylates, and copolymers of (meth)acrylic acid and (meth) acrylic ester. In many cases it is advantageous to employ crosslinked polymers. As a natural polyamide, gelatine is particularly suitable. It is employed in particular as the coacervate and complex coacervate. Gelatine-containing complex coacervates for the purposes of the invention are, in particular, combinations of gelatine and synthetic polyelectrolytes. Suitable synthetic polyelectrolytes are copolymers with incorporated units of, for example, maleic acid, acrylic acid, methacrylic acid, acrylamide and methacrylamide. Gelatine-containing capsules can be crosslinked with customary curing agents such as, for example, formaldehyde or glutaraldehyde.

The microencapsulated biocide can be in the form of a single biocide particle enveloped by a polymer shell. Alternatively, there may be a polymer particle in which a large number of biocide particles are enclosed or in which the biocide is present in molecularly disperse form. The microencapsulation of isolated biocide particles can be carried out by known methods, for example by applying a finished polymer from solution by precipitating the polymer or evaporating the solvent. It is also possible to produce the polymer on the surface of the biocide particle by means of assembly reactions, such as addition polymerization, polyaddition or polycondensation.

The preparation of polymer particles comprising a large number of enclosed biocide particles can be carried out, for example, by melt compounding with subsequent comminution. Another very suitable process for preparing biocide-containing polymer particles is bead addition polymerization. In this procedure, liquid mixtures of monomers and biocide are broken up into small droplets and cured, giving spherical particles in which the active substance is enclosed. Suitable monomers for preparing biocide-containing bead addition polymers are, for example, the following monofunctional monomers and multifunctional monomers, which generally act as crosslinkers: styrene, vinyltoluene, chlorostyrene, chloromethylstyrene, acrylic acid, methacrylic acid, acrylates, methacrylates, acrylonitrile, methacrylonitrile, acrylamide, methacrylamide, vinyl chloride, vinylidene chloride, vinyl acetate, divinylbenzene, diethylene glycol divinyl ether, 1,7-octadiene, 1,5-hexadiene, ethylene glycol dimethacrylate, triethylene glycol dimethacrylate, trimethylolpropane trimethachrylate and allyl methacrylate.

It has been found that antifouling coatings with bead addition polymers comprising active substance permit high filling levels and have very good processing properties.

The average particle size of the microencapsulated biocides is from 0.1 to 200 μm, preferably from 0.2 to 20 μm.

The proportion of the micro-encapsulated biocides is from 1 to 50, preferably from 2 to 40% by weight, based on the antifouling coating.

Suitable binders are the film forming binders known for coatings. By way of example there may be mentioned: polyesters polyacrylates, polyurethanes, polyamides, chlorinated rubbers, polyvinyl chloride and polysiloxanes. Also highly suitable are so-called 2-component systems, in which the binder is produced from two reactive components in the coating. Preferred 2-component systems are, for example, polyurethanes formed from a polyester- or polyetherdiol and a diisocyanate. Through the incorporation of polysiloxane units into, for example, a polyetherdiol it is possible to produce polyurethanes having anti-adhesion properties. Binders which consist predominantly of polysiloxane units are available both as condensation-crosslinking 1-component systems and as addition-crosslinking 2-component systems. The binders can be processed from organic solvents or as an aqueous dispersion. Examples of suitable organic solvents are aliphatic hydrocarbons, especially petroleum fractions, aromatic hydrocarbons, halogenated hydrocarbons, alcohols, ketones, esters and ethers.

In addition to the microencapsulated heavy-metal-free biocides and the organopolysiloxanes, the antifouling coating compositions of the invention may generally include, as well as the binders, customary auxiliaries such as, for example, fillers, solvents, plasticizers, dyes, pigments, catalysts, inhibitors, tackifiers, coatings additives and/or common dispersing or formulating auxiliaries. In addition to the heavy-metal-free biocides it is also possible, of course, for heavy-metal-containing biocides to be present as well, such as, for example, N-(cyclo-hexyldiazeniumdioxy)-tributyltin bis-N-(cyclohexyldiazeniumdioxy)-copper; metal soaps, such as tin, copper, and zinc naphthenate, octoate, 2-ethylhexanoate, oleate, phosphate and benzoate, metal salts, such as copper hydroxycarbonate, sodium dichromate, potassium dichromate, potassium chromate, copper sulphate, copper chloride, copper borate, zinc fluorosilicate, copper fluorosilicate, copper salt of 2-pyridine-thiol 1-oxide; oxides, such as tributyltin oxide, $Cu_2O$, CuO and ZnO; Ag, Zn or Cu-containing zeolites alone or enclosed in polymeric active substances, although in this case the ecological advantage is limited.

The examples which follow are intended to illustrate the invention. The invention is not limited to the examples. All references to parts and percentages are by weight unless otherwise indicated.

EXAMPLE 1

Microencapsulation of Diuron (Envelopment)

The following ingredients were weighed out into a bead mill:

| | |
|---|---|
| 12 g | of diuron, |
| 0.06 g | of dispersant (Baykanol SI, Bayer AG), |
| 48 g | of a 5% strength aqueous alkaline solution of a terpolymer of 24% by weight methacrylic acid, 36% by weight methyl methacrylate and 40% by weight butyl acrylate, and |
| 10 g | of water. |

The mixture was shaken for 20 h, during which the diuron particles were reduced to a size of from 0.5 to 1.0 μm. The mixture was subsequently acidified with 15 ml of 1n HCl, and heated at 60° C. for 1 h, and the solid was filtered off, washed with 30 ml of water and dried in vacuo at 60° C. This gave 14.2 g of microencapsulated diuron.

EXAMPLE 2

Microencapsulation of Diuron (Bead Polymerization)

In a ball mill, 100 g of diuron, 30 g of highly disperse silica (HDK H 2000), Wacker Chemie GmbH), 285 g of methyl methacrylate and 15 g of ethylene glycol dimethacrylate were mixed thoroughly at room temperature for 10 h. Subsequently, 3 g of dibenzoyl peroxide were added and the mixture obtained was transferred to a 3 l stirred reactor containing 1.5 l of a 1% strength aqueous alkaline solution (adjusted to a pH of 0.8 with NaOH) of a copolymer of 50% by weight methacrylic acid and 50% by weight methyl methacrylate. The stirring speed was set at 600 rpm and the temperature was held at 78° C. for 2 h and then at 85° C. for 1 h. After cooling, the solid obtained was isolated by decanting, washed a number of times with water and dried at 80° C. for 12 h. This gave 385 g of microencapsulated diuron in the form of bead addition polymers having an average particle size of 15 μm.

EXAMPLE 3

Microencapsulation of Alsystin (Envelopment)

Example 1 was repeated using alsystin instead of diuron. 13.5 g of microencapsulated alsystin were obtained.

EXAMPLE 4

Coating in Accordance with the Invention (Polyvinyl Acetate)

40 g of polyvinyl acetate (Movilith 50, Hoechst AG) were dissolved in 120 ml of toluene. 40 g of microencapsulated diuron from Example 1 were dispersed in this solution with the aid of a high-speed stirrer. With the aid of a doctor blade, the dispersion was applied in a wet film thickness of 250 μm to a metal plate coated with epoxy lacquer. The coating is dried at 60° C. for 10 h. This gave a homogeneous coating having a coat thickness of about 100 μm.

EXAMPLE 5

Coating in Accordance with the Invention (Silicone Resin)

11.67 g of a silicone resin solution having a viscosity of 3000 mPas and comprising 77.1% by weight of methyl silicone resin of percentage composition $T_{89.3}D_9M_{1.7}$ in the paint solvent IsoparG were diluted with a further 4 g of paint solvent IsoparG. 0.5 g of microencapsulated diuron from Example 1 and 0.5 g of microencapsulated alsystin from Example 3 were dispersed in this solution with the aid of a high-speed stirrer. With the aid of a doctor blade, the dispersion was applied in a wet film thickness of 250 μm to a metal plate coated with epoxy lacquer. The coating was dried at 60° C. for 10 h. This gave a homogeneous coating having a coat thickness of about 150 μm.

EXAMPLE 6

Comparative Example (Not in Accordance with the Invention)

Example 4 was repeated using, instead of 40 g of microencapsulated diuron from Example 1 (which contains 83.33% of active substance), 33.3 g of finely ground non-microencapsulated diuron. This gave a coating having a coat thickness of about 100 μm. The coating was not homogeneous. Particles and/or agglomerates of active substance were visible with the naked eye. The surface of the coating was rough.

EXAMPLE 7

Application Test for Testing the Attachment of Benthic Diatom Algae (Nitzschia Usilla) to Coatings According to the Invention

| Test organism: | Diatom alga Nitzschia (benthic diatom alga) |
| --- | --- |
| Medium: | ASW medium |
| Culture vessels: | Erlenmeyer culture flasks |
| Test conditions: | Temperature: 18° C., permanent artificial light, permanent movement on a tumble shaker, without additional aeration. |
| Evaluation: | Comparison of a coating according to the invention with respect to infestation with a metal plate coated with epoxy lacquer. The degree of infestation is scored as follows:<br>+++: good, uniform infestation<br>++: low infestation<br>+: very low infestation<br>−: no infestation |

| Example | | Infestation after 14 days |
| --- | --- | --- |
| 7 A | 14 days' exposure of the novel coating from Example 5 under above test conditions | — |
| 7 B Comparative | Metal plate coated with epoxy lacquer, exposure as for 7 A | +++ |

Use of the Application examples:

The coating in accordance with the invention from Example 5 showed no infestation (−) under the stated test conditions.

A metal plate coated with an epoxy lacquer, on the other hand, in Example 7B showed uniformly severe infestation (+++).

Although the invention has been described in detail in the foregoing for the purpose of illustration, it is to be understood that such detail is solely for that purpose and that variations can be made therein by those skilled in the art without departing from the spirit and scope of the invention.

What is claimed is:

1. A composition comprising a mixture of
   (a) a film former, and
   (b) at least one heavy-metal-free biocide that has previously been microencapsulated by bead addition polymerization.

2. A composition according to claim 1 wherein the biocides are degradable in sea water.

3. A composition according to claim 2 wherein the biocides have a half life of less than 180 days in sea water at 25° C.

4. A composition according to claim 1 additionally comprising inorganic pigments, organic pigments, dyes, customary auxiliaries, or mixtures thereof.

5. A process for preparing antifouling compositions comprising admixing film-forming constituents with at least one heavy-metal-free biocide that has previously been microencapsulated by bead addition polymerization.

6. An antifouling composition obtained by the process according to claim 5.

7. A process for producing antifouling coatings comprising applying to an article to be protected an antifouling composition comprising a mixture of a film former and at least one heavy-metal-free biocide that has previously been microencapsulated by bead addition polymerization.

* * * * *